Sept. 2, 1941. A. MARNEY 2,254,437
BUILT-IN FOLDING TRAILER
Filed March 10, 1941 2 Sheets-Sheet 1
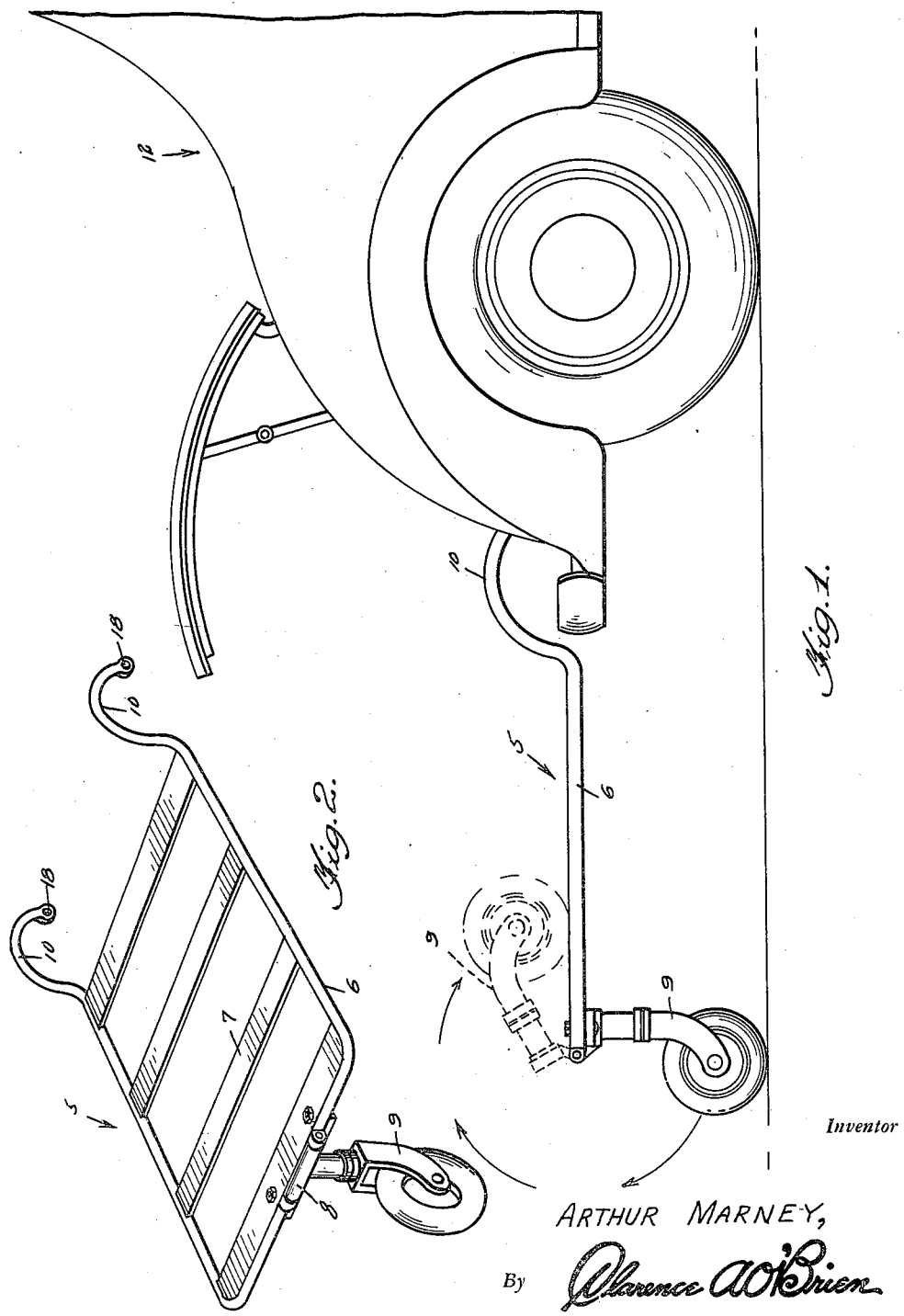
Inventor
ARTHUR MARNEY,
By Clarence A. O'Brien
Attorney Sept. 2, 1941.  A. MARNEY  2,254,437
BUILT-IN FOLDING TRAILER
Filed March 10, 1941  2 Sheets-Sheet 2
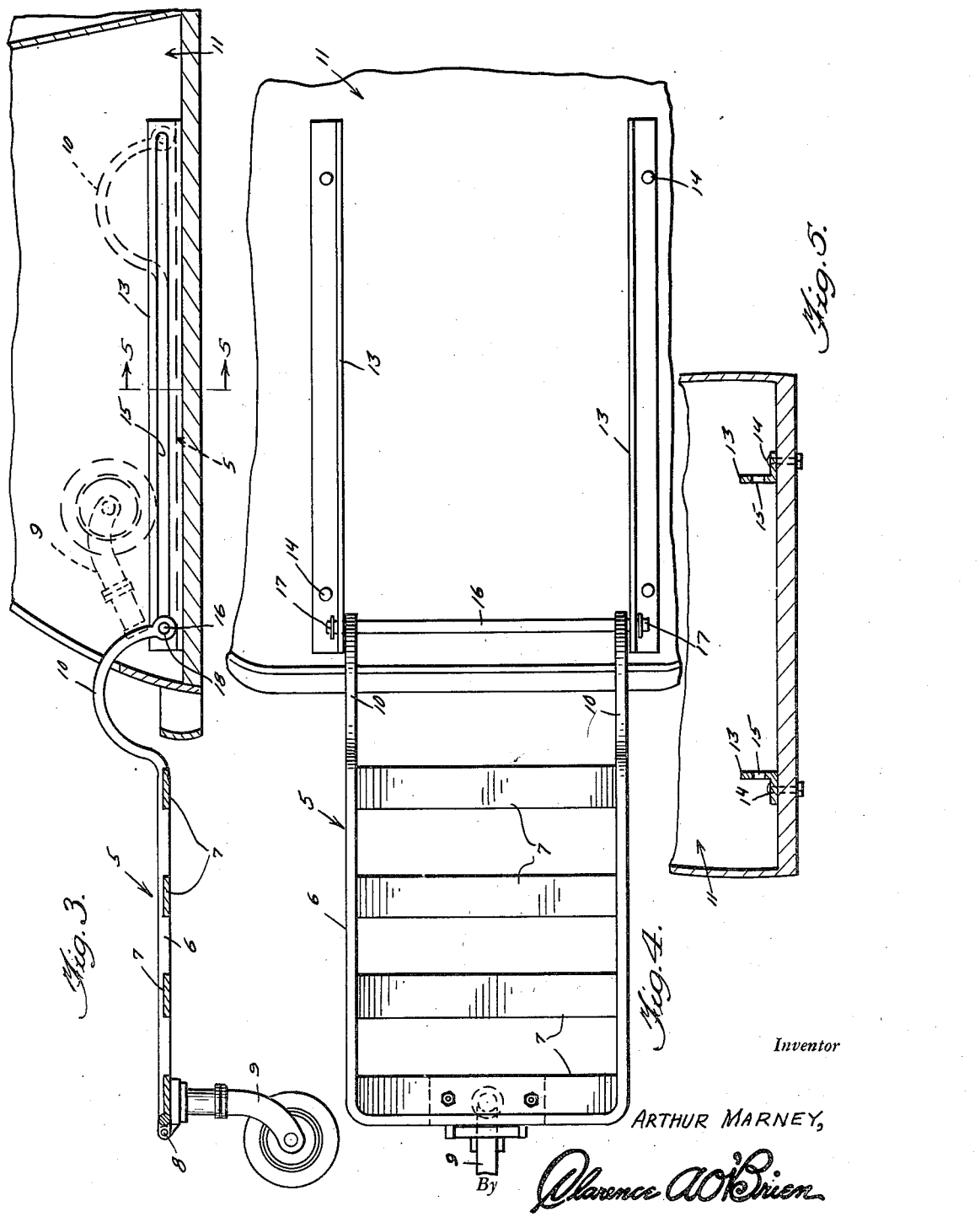
Inventor
ARTHUR MARNEY,
By Clarence A. O'Brien
Attorney Patented Sept. 2, 1941

2,254,437

UNITED STATES PATENT OFFICE 2,254,437

BUILT-IN FOLDING TRAILER

Arthur Marney, Los Angeles, Calif.

Application March 10, 1941, Serial No. 382,616

4 Claims. (Cl. 296—26)

This invention relates broadly to vehicles, and more particularly to trailer vehicles.

The present invention may be aptly termed a "built-in folding trailer," the same being in the form of a trailer which, when not in use, may be positioned on, or in the body of the draft vehicle and which, for use, can be readily removed from the body of the draft vehicle and positioned rearwardly thereof to serve the purpose for which designed.

A further object of the invention is to provide a trailer assembly particularly designed for use in connection with passenger motor vehicles, the object, intent and purpose of the invention being to provide a trailer which when not in use can be readily stored in the trunk compartment of the vehicle.

The invention, together with its objects and advantages will be best understood from a study of the following description taken in connection with the accompanying drawings wherein:

Figure 1 is a side elevational view illustrating the application of the invention with the supporting wheel of the trailer shown in operative position in full lines and in an inoperative or folded position by dotted lines.

Figure 2 is a perspective view of the trailer truck.

Figure 3 is a sectional view through the trailer truck and the trunk part or compartment of an automobile body further illustrating the application of the invention.

Figure 4 is a plan view of the trailer truck with the trunk portion of the automobile body shown fragmentarily and substantially in plan.

Figure 5 is a detail transverse sectional view taken substantially on the line 5—5 of Figure 3.

Referring more in detail to the drawings it will be seen that the trailer indicated generally by the reference numeral 5 embodies a body composed of a substantially U-shaped frame 6 and cross slats 7.

At the closed end of the U the frame 6 has hinged thereto as at 8 a supporting wheel assembly 9 for the trailer; the supporting wheel assembly 9 being shown in the form of a caster wheel.

At the open end of the U the sides of the frame 6 are bent upwardly from the plane of the trailer truck and longitudinally curved as at 10.

Also in accordance with the present invention there are provided in the trunk or rear compartment 11 of the body of a passenger automobile, and which body is shown fragmentarily and indicated generally by the reference numeral 12, a pair of laterally spaced, opposed, parallel rails 13—13.

In the present instance the rails 13 are formed of angle iron and have the base flanges thereof bolted or otherwise anchored as at 14 to the floor of the compartment 11 as shown.

The vertical flanges of the rails 13 are provided with slots 15 elongated longitudinally thereof, and a hinge bar 16 has the opposite ends thereof working in the slots 15 as shown.

On the respective opposite ends thereof the bar 16 is provided with suitable collar or stop assemblies 17 to prevent complete accidental lateral displacement of the hinge bar 16 relative to the rails 13.

The terminals 10 of the sides of frame 6 have formed integral therewith hinge eyes 18 through which the hinge bar 16 is trained. Thus it will be seen that the hinge bar 16 provides a pivot about which the frame of the trailer 5 may be vertically swung.

When the trailer 5 is not in use, the same is housed completely within the compartment 11 as suggested by broken lines in Figure 3, and when so housed in the compartment the wheel assembly 9 of the trailer is folded back upon the body or frame of the trailer, as also shown by broken lines in Figure 3.

When the trailer is to be used, the operator pulls the trailer forwardly through the opening of the compartment 11, and substantially to the position suggested in Figures 1 and 4. In this position the wheel assembly 9 is swung from the dotted line position shown in Figure 1 to the full line position shown in said figure for supporting the rear end of the trailer.

Obviously, with the trailer 5 thus positioned relative to the body 12 of the lead vehicle, it will serve as a carrier for camping equipment or for any other purpose desired.

It will also be appreciated, as suggested in Figure 3, that when the trailer 5 is bodily positioned within the compartment 11 it will utilize but a comparatively small part of the storage space of said compartment 11, permitting the compartment to be used, with little or no difficulty, for the purposes for which such compartments are usually provided.

It is thought that the many advantages of a trailer embodying the features of the present invention will be appreciated from the foregoing.

It is also to be understood that while I have herein illustrated and described the preferred embodiment of the invention, I claim all such forms of the invention to which I am entitled in view of the prior art and scope of the appended claims.

Having thus described the invention what is claimed as new is:

1. In combination with the trunk compartment of a motor vehicle body, a pair of opposed rails secured within said compartment, a hinge rod having the opposite ends thereof engaged with said rails and supported therebetween for movement longitudinally of the rails, a trailer truck frame provided at one end thereof with hinge eyes through which said rod is trained, and a supporting wheel assembly hinged to said truck frame at the end thereof remote from said rod.

2. In combination with the trunk compartment of a motor vehicle body, a pair of opposed rails mounted in said compartment and provided with elongated slots, a trailer-truck frame provided with a transverse rod at one end thereof, said rod having the ends thereof engaged in the slots of said rails, and a supporting wheel assembly for said frame hinged to the frame and foldable relative thereto.

3. In a trailer assembly for motor vehicle bodies characterized by a trunk compartment, a pair of slotted rails adapted to be secured within said compartment in spaced parallelism, a truck frame, a hinge rod to which said frame at one end of the latter is pivoted to swing relative to the hinge rod, said hinge rod bridging the space between said rails and having the ends thereof engaged in the slots of said rails, and supporting means for said frame at the end thereof remote from said rod and hinged thereto for folding movement relative to said frame.

4. In a trailer assembly for motor vehicle bodies characterized by a trunk compartment, a pair of slotted rails adapted to be secured within said compartment in spaced parallelism, a truck frame, a hinge rod to which said frame at one end of the latter is pivoted to swing relative to the hinge rod, said hinge rod bridging the space between said rails and having the ends thereof engaged in the slots of said rails, and supporting means for said frame at the end thereof remote from said rod and hinged thereto for folding movement relative to said frame; and said supporting means being in the form of a caster wheel.

ARTHUR MARNEY.